W. S. McLean,
Sash Holder.
Nº 4,495. Patented May 2, 1846.

UNITED STATES PATENT OFFICE.

WM. S. McLEAN, OF ALLEGHENY, PENNSYLVANIA.

WINDOW-SASH FASTENER.

Specification of Letters Patent No. 4,495, dated May 2, 1846.

*To all whom it may concern:*

Be it known that I, WILLIAM S. MCLEAN, of the city of Allegheny, county of Allegheny, and State of Pennsylvania, have invented a new and useful Improvement in Window-Sash Fasteners, by which means the sliding sash can be suspended at any point and locked, so as to prevent it from being opened or raised from the outside, and do hereby declare that the following is a full, clear, and exact description of the construction and operation of the same, reference being had to the annexed drawings, making part of the specification.

Figure 1:
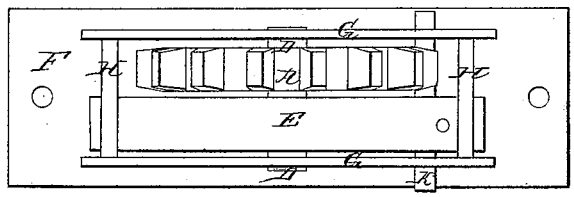
Figure 2:
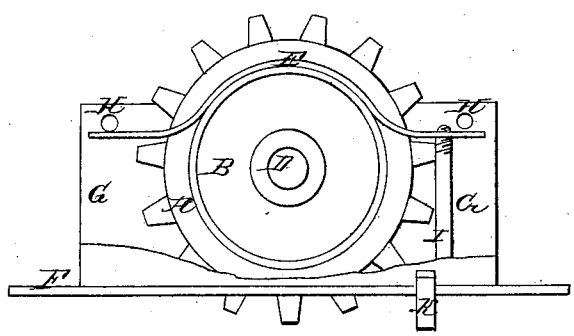
Figure 4:
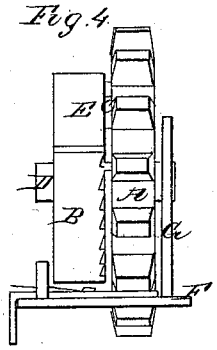
Figure 3:
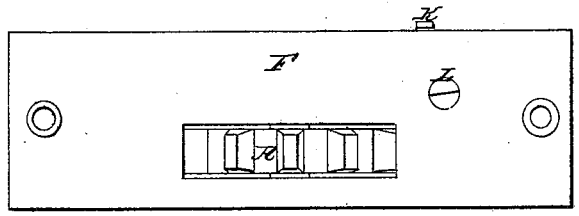

Figure 1 back view, Fig. 2 side view, Fig. 3 face view, and Fig. 4 an edge or end view of the apparatus, the other drawings represent different parts of the machine when disconnected.

Alike letters refer to alike parts in the different views.

F F F is a plate of metal having a slot cut in it as seen at Fig. 3, to this plate is riveted the side plates G, G.

H H are pins or studs to secure or support the out edge of plates G, G.

Figure 6:
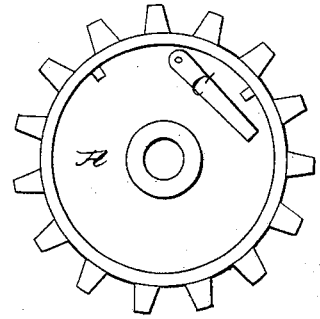

B B B, is a friction ratchet wheel, with shaft D D D cast fast to it, the shaft supported in holes in the side plates G G. The rack or ratchet is cast on the face or side of friction wheel, next to the cog wheel A, A, A, A, the cog wheel being at liberty to turn loosely on the shaft D, to the side of the cog wheel is made fast the spring latch C C, as is better seen in Fig. 6, this spring latch catches in the rack of the friction wheel B, which prevents the cog wheel from turning or revolving on the shaft but only one way.

E E E is a friction spring, bearing on the friction ratchet wheel B B, one end of this spring is secured under the stud H, as at I in Fig. 2, the other end is kept down by means of the regulating screw L L, the head of which is also seen in Fig. 3, by means of this screw you can increase or diminish the friction at pleasure to suit the weight of any sash.

Figure 5:
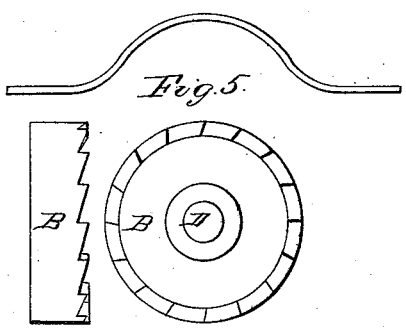
Figure 7:
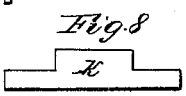
Figure 8:
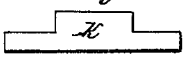

K K is a small slide pin or bolt to be forced under the cogs of wheel A A, when it is desired to fasten the sash down, this is better seen in Fig. 4. Fig. 5 shows the rack on the side of friction wheel, the other drawings not showing it, and this figure shows the friction wheel without the shaft which is cast to it, Figs. 7 and 8 shows the form of the bolt pin K, K.

This apparatus is mortised or let into the window frame above and below the meeting rail of the sash, and sunk flush with the front plate F F. It will be seen by Fig. 2, that the cog wheel projects through the face plate, the length of the cog, the edge of the sash is cut out in notches corresponding to the pitch of the cogs of the wheel.

The operation is as follows: As you raise the sash the cog wheel turns freely on the shaft of friction wheel, but when you let go of the sash the spring latch C takes hold of the friction wheel, and the friction caused by the spring E will be sufficient to keep the cog wheel from turning, and of course keep the sash suspended at any height it may be set, when you wish to lock or make all fast shove in the bolt K.

What I claim as my invention and desire to secure by Letters Patent, is—

The combination of the cog wheel, friction ratchet wheel, friction spring, and lock bolt, as applied to window sash, in the manner described.

WM. S. McLEAN.

Witnesses:
  C. EVANS,
  LEONARD L. JOHNS.